United States Patent
Musellec

[11] Patent Number: 5,941,577
[45] Date of Patent: Aug. 24, 1999

[54] LOCKABLE QUICK CONNECTOR

[75] Inventor: Jean-Noël Musellec, Rennes, France

[73] Assignee: Legris S.A., Rennes, France

[21] Appl. No.: 09/068,951

[22] PCT Filed: Nov. 4, 1996

[86] PCT No.: PCT/FR96/01728

§ 371 Date: May 21, 1998

§ 102(e) Date: May 21, 1998

[87] PCT Pub. No.: WO98/13639

PCT Pub. Date: Apr. 2, 1998

[30] Foreign Application Priority Data

Sep. 24, 1996 [FR] France ................................. 96 11598

[51] Int. Cl.[6] .................................................. F16L 39/00
[52] U.S. Cl. ........................................ 285/317; 285/921
[58] Field of Search ..................................... 285/317, 921

[56] References Cited

U.S. PATENT DOCUMENTS

| 4,700,926 | 10/1987 | Hansen . | |
|---|---|---|---|
| 4,889,368 | 12/1989 | Laipply | 285/921 X |
| 5,104,158 | 4/1992 | Meyer et al. | 285/317 X |
| 5,160,177 | 11/1992 | Washizu | 285/921 X |
| 5,374,088 | 12/1994 | Moretti | 285/317 X |

FOREIGN PATENT DOCUMENTS

| 2429370 | 1/1980 | France . |
| 2705430 | 11/1994 | France . |
| 1961831 | 6/1967 | Germany . |

Primary Examiner—Dave W. Arola
Attorney, Agent, or Firm—Griffin, Butler, Whisenhunt & Szipl, LLP

[57] ABSTRACT

A quick connector comprising a female part (1) having a bore (8, 11), a male part (2) having an outer collar (6) suitable for being inserted in the bore, and a locking ring (3) mounted to slide radially in a housing (10) of the female part, which housing subdivides the bore into an inlet section (8) and a main section (11), the ring (3) being movable between a first position in which it is eccentric relative to the bore and a second position in which it is substantially coaxial with said bore, said ring being integral with a resilient member in the form of at least one tongue (12, 13) co-operating with the housing (10) to urge the ring (3) into its first position, wherein the ring (3) includes a thrust platen (9) adjacent to the inlet section (8) of the bore and projecting beside the tongue (12, 13), at least the free end portion of the tongue being of a width (L) that is less than the thickness (E) of the ring (3) minus the thickness (e) of the platen (9) measured in the same axial direction.

4 Claims, 1 Drawing Sheet

LOCKABLE QUICK CONNECTOR

The present invention relates to a quick connector comprising a male portion and a female portion that couple merely by inserting one in the other.

BACKGROUND OF THE INVENTION

In circuits for conveying fluids under pressure and that implement quick connectors, it is desirable, and often required, to make use of means that lock any connection positively. A completed male connection is firstly a source of leaks and secondly a risk of uncoupling, with the least severe consequence being to put the machine including the pressurized fluid circuit out of order, while if the machine is a car, the consequences can include accidents (no pressure in the hydraulic brake circuits, fuel leakage into the engine compartment possibly leading to a fire,. . . ).

There exist numerous devices for locking the male element in the female element of a quick connector. Substantially all of them operate on the same principle, implementing generally identical means consisting in a keying member which is interposed between a radial surface of the endpiece (groove or collar) and a radial surface of the female element (likewise a groove or a collar). The keying member be inserted manually or it may be held in its locking position by a resilient return member against the effect of which it can be put in a retracted position (either displaced or deformed) during insertion of the endpiece.

In a particularly simple implementation of that device, the lock is constituted by a ring mounted to slide radially in a housing formed in the female part of the connector, between a rest and locking first position in which it is eccentric relative to the axis of the bore of the female part, and a retracted second position in which it is substantially coaxial with the bore.

A resilient member constituted by two tongues integral with the ring is interposed between the ring and the female part and urges the ring towards its first position.

Such a ring is shown in a connector in FIGS. 1 and 2. The drawing shows clearly the relative weakness of such a part at withstanding adequately a large pull-out force. In the connector shown, the female part 1 includes a lock for preventing the endpiece 2 being extracted once it has been properly inserted in the female part 1. The lock is constituted by a ring 3 that can slide radially in the female part 1, in an open housing formed therein, and which includes two outer resilient tongues 4 urging the bore through the ring 3 away from the axis of the bore of the female part 1. The portion of the bore through the ring 3 situated on one side of the tongues 4 is in the form of a surface 5 (e.g. a cylindrical surface) whose axis slopes relative to the axis of the ring, such that when the collar 6 of the endpiece 2 goes past, said surface forms a ramp for moving the axis of the bore through the ring 3 away from the axis of the part 1. The ring 3 can then move against the force of the resilient tongues 4 until the collar 6 is received inside the part 1 beyond the ring 3. The tongues 4 then relax and the ring is back in its free position where it is eccentric relative to the bore in the female part, and one of its flanks comes into contact with the rear flank of the collar 6 and constitutes an abutment opposing extraction of the endpiece 2, since said ring is held axially by the front partition 7 of the female part which possesses an insertion orifice 8 for the male endpiece. On examining the figures, it can be seen that towards the bottom there is little ring material located behind the partition 7. The material is constituted essentially by the tongues 4 since the ring 3 has very little contact area with the partition 7 at the lowest point 5a of the ramp 5. If a large extraction force is applied, then the bottom portion of the ring can deform and penetrate into the orifice 8 while the tabs are locked behind the partition 7. This deformation can be irreversible and lead to the lock being totally destroyed. Any attempt at increasing the thickness of the wall of the ring 3 beneath the ramp 5 to benefit from a larger contact area would require the dimensions of the female part 1 to be completely changed, increasing its overall size for given amplitude of resilient displacement of the tongues 4.

OBJECTS AND SUMMARY OF THE INVENTION

The present invention proposes solving this problem by providing a solution whereby the axial thrust of the ring against the inlet wall 7 of the female part is improved without any need to increase the overall bulk thereof.

The invention thus provides a quick connector comprising a female part having a bore, a male part having an outer collar suitable for being inserted in the bore, and a locking ring mounted to slide radially in a housing of the female part, which housing subdivides the bore into an inlet section and a main section, the ring being movable between a first position in which it is eccentric relative to the bore and a second position in which it is substantially coaxial with said bore, said ring being integral with a resilient member in the form of at least one tongue co-operating with the housing to urge the ring into its first position. According to the invention, the ring includes a thrust platen adjacent to the inlet section of the bore and projecting beside the tongue, at least the free end portion of the tongue being of a width that is less than the thickness of the ring minus the thickness of the platen measured in the same axial direction.

This platen provides the ring with a bearing area against the partition 7 that is greater than that provided in the prior art ring, but it does so without increasing the overall size of the device where the resilient tongues can be compressed and can retract behind the platen carrying said thrust area.

In a preferred embodiment, the ring has two tongues disposed symmetrically about a radial midplane, and the platen has back reinforcement between the two ends of the tongues. Finally, it will be observed that the radial extent of the edges of the platen along the mid-axis is substantially equal to the thickness of the tongues.

BRIEF DESCRIPTION OF THE DRAWINGS

Other characteristics and advantages of the invention appear from the description given below of an embodiment.

Reference is made to the accompanying drawings, in which.

MORE DETAILED DESCRIPTION

Figure 1:
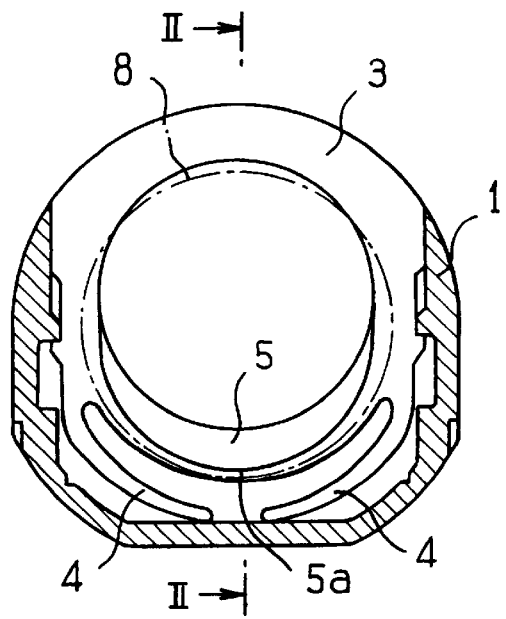
FIG. 1 is a section on plane II of FIG. 2 through a locking quick connector of the prior art.
Figure 2:
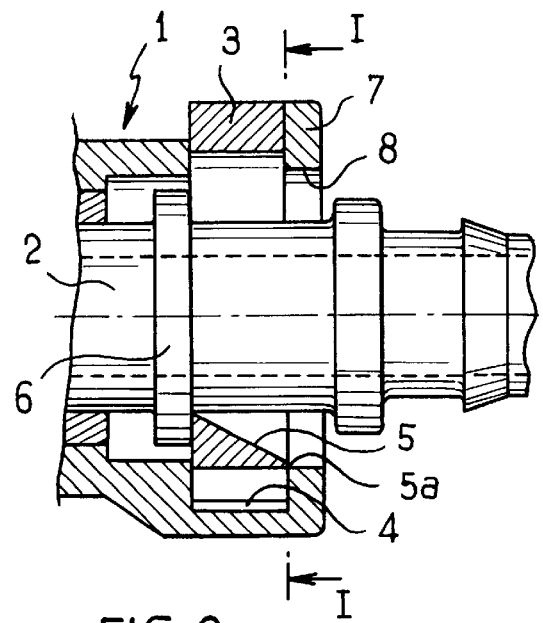
FIG. 2 is a section on plane II—II of FIG. 1.
Figure 3:
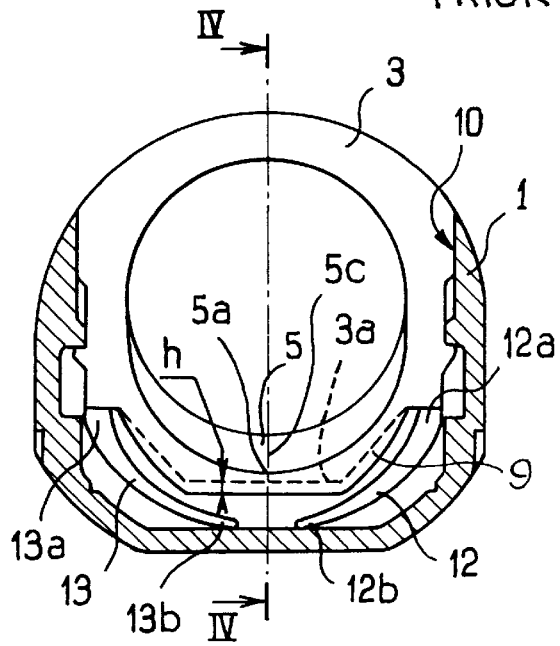
FIGS. 3 and 4 show an embodiment of the invention on section planes similar to those of FIGS. 1 and 2.
Figure 4:
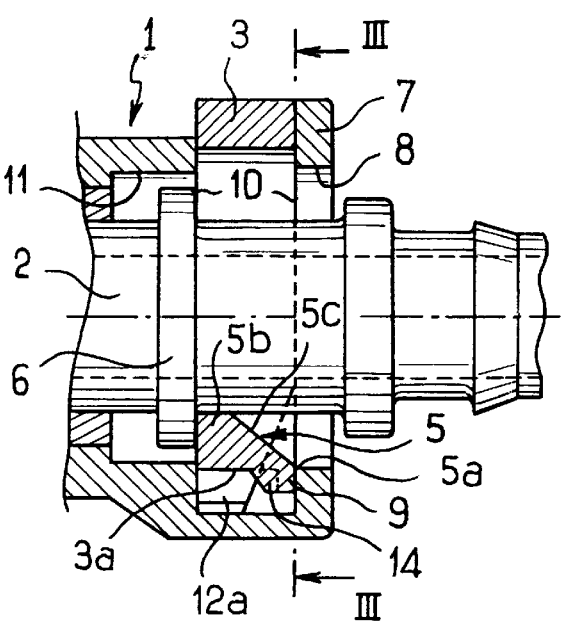
Figure 5:
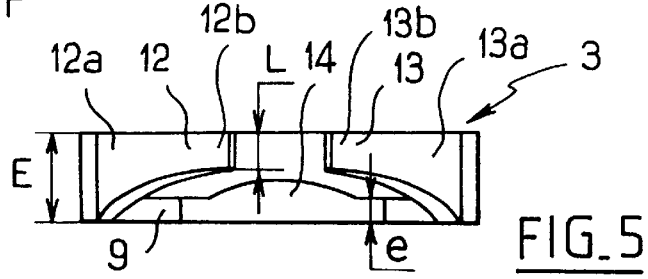
FIG. 5 is a view along arrow F of FIG. 3 showing the ring on its own as implemented in the connector of the invention.

FIGS. 3, 4, and 5 reproduce elements described above with reference to FIGS. 1 and 2 and given the same references. In the embodiment shown in FIGS. 3 to 5, the ring 3 includes a projecting platen 9 situated in the vicinity of the lowest point 5a of the ramp 5 adjacent to the partition 7 that possesses the orifice 8 for insertion of the male element of the connector into the female part 1. The partition 7 is the result of the presence of the housing 10 formed transversely in the female part 1, and intersecting the internal bore thereof to subdivide it into two portions, namely: the inlet opening 8 for the male element; and the main section 11 in which the collar 6 of the male element 2 is housed when the connector is in operation. The shape of this housing 10 and the way it co-operates with the ring 3 are described in patent No. 93/05842 (U.S. Pat. No. 2,705,430) in the name of the Applicant.

Adjacent to the partition 7, the platen 9 thus projects beyond the outside surface 3a of the bottom portion of the ring 3, particularly in the vicinity of the lowest point 5a of the ramp 5 so as to provide increased thrust area and increased sliding area for the ring in said zone against the partition 7. The thickness e of the platen is very considerably smaller than the total thickness of the ring 3 (dimensions measured axially) so that when compressed the resilient tongues of the ring can be received behind the platen. To do this, the resilient tongues 12 and 13 of the embodiment of the invention are of width that tapers from their roots and going towards their free ends, such that the width L of the tongues at said free ends is less than the thickness E of the ring minus the thickness e of the platen 9. In an embodiment that is not shown, the tongues 12 and 13 could be of constant width L.

As in the prior art embodiment, the ring 3 has two resilient tongues 12 and 13 that are symmetrical to each other about a radial midplane of the ring (e.g. the section plane IV—IV of FIG. 3). Since the ends of the tongues 12 and 13 are the narrowest portions thereof, they can be designed to enable the platen 6 to be provided with extra rear thickness 14 for reinforcing purposes in register with said ends, as can be seen in FIG. 5. This extra thickness 14 gives the platen 9 greater ability at withstanding such a pull-out force in the vicinity of the point 5a, i.e. the point where the highest stress concentration occurs when a force is applied to pull out the endpiece 2.

It will also be observed that the tongues 12 and 13 (see FIG. 3) are of tapering thickness starting from their roots 12a, 13a and extending to their free ends 12b, 13b. Thus, when the tongues are compressed, i.e. when the ring is pushed down inside the housing 10, the finished portions of the tongues are easily received behind the platen 9 whose height h in the vicinity of the projecting point 5a relative to the outside wall 3a of the ring at this location can be greater than said thickness. Compared with the prior art, this disposition provides the same amount of resilient displacement for the ring 3 in its housing 10 while nevertheless increasing the size of the area of said ring 3 in abutment against the partition 7.

Finally, it will be observed in FIG. 4 that the ramp 5 is shorter and slopes more steeply than in the prior art.

Still for the purpose of being able to withstand a large force attempting to extract the endpiece, provision has been made to reinforce the thickness of the zone of the ring which intercepts the collar in the locking position. This zone is referenced 5b in FIG. 4. It is obtained by increasing the slope of the ramp 5. In this respect, it should be observed that the lowest point 5a of the ramp 5 is situated when the ring 3 is in its first position level with the bottom portion of the bore 8 and that it cannot go beyond it without constituting an obstacle to penetration of the collar 6. By complying with this constraint, the increase of thickness in the zone 5b means that the slope of the ramp is necessarily steeper than in the prior art ring, other things being equal. This steeper ramp has the effect for given insertion force applied to the collar 6 of having a downward component, i.e. a component for retracting the ring 3, that is smaller than in the prior art mechanism. To mitigate this drawback, a special ramp profile has been found that serves to minimize the axial components of the friction force opposing penetration of the collar. Thus, the ramp 5 is cylindrical, being generated by a portion of a circle of diameter equal to that of the collar perpendicular to the axis of the ring 3 and moved parallel to itself along the straight line 5c that constitutes the trace of the ramp in the plane of FIG. 4.

I claim:

1. A quick connector comprising a female part (1) having a bore (8, 11), a male part (2) having an outer collar (6) suitable for being inserted in the bore, and a locking ring (3) mounted to slide radially in a housing (10) of the female part, and means for retaining said ring in said housing, which housing subdivides the bore into an inlet section (8) and a main section (11), said inlet section formed in a partition (7) of said housing, the ring (3) being adjacent to said partition and being movable between a first position in which it is eccentric relative to the bore and a second position in which it is substantially coaxial with said bore, said ring being integral with a resilient member in the form of at least one tongue (12, 13) co-operating with the housing (10) to urge the ring (3) into its first position, wherein the ring (3) includes a thrust platen (9) adjacent to the inlet section (8) of the bore and projecting radially beside the tongue (12, 13) for engagement with said partition, at least the free end portion of the tongue being of a width (L) that is less than the thickness (E) of the ring (3) minus the thickness (e) of the platen (9) measured in the same axial direction and said ring radially movable to said concentric position to receive said outer collar of said male part therethrough and engage said outer collar to retain said male part in said housing when in said eccentric position.

2. A connector according to claim 1, wherein the ring (3) has two tongues (12, 13) disposed symmetrically about a radial midplane, and wherein the platen (9) has back reinforcement (14) between the two ends (12a, 13a) of the tongues (12, 13).

3. A connector according to claim 2, wherein the radial height (h) along the mid-axis of the portion of the platen (9) that projects relative to the ring is substantially equal to the thickness of the ends (12a, 13a) of the tongues (12, 13).

4. A connector according to claim 1, wherein to displace the ring from its second position towards its first position when the collar (6) passes through, the ring (3) possesses a ramp (5) co-operating with the collar (6) during insertion of the endpiece (2) into the female part (1), the ramp being formed by a cylindrical surface generated by a portion of a circle of diameter equal to the diameter of the collar (6), perpendicular to the axis of the ring, and displaced parallel to itself along a generator line (5c) that slopes relative to the axis of the ring.

* * * * *